US009327194B2

(12) United States Patent
Douceur et al.

(10) Patent No.: US 9,327,194 B2
(45) Date of Patent: *May 3, 2016

(54) PARTITIONED ARTIFICIAL INTELLIGENCE FOR NETWORKED GAMES

(75) Inventors: John R. Douceur, Bellevue, WA (US); Michael P. Calligaro, Redmond, WA (US); Randall C Wood, Snohomish, WA (US); Jacob R. Lorch, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 987 days.

This patent is subject to a terminal disclaimer.

(21) Appl. No.: 13/372,305

(22) Filed: Feb. 13, 2012

(65) Prior Publication Data
US 2012/0142430 A1    Jun. 7, 2012

Related U.S. Application Data

(63) Continuation of application No. 12/029,286, filed on Feb. 11, 2008, now Pat. No. 8,137,199.

(51) Int. Cl.
*A63F 9/24*    (2006.01)
*A63F 13/40*    (2014.01)
*A63F 13/30*    (2014.01)

(52) U.S. Cl.
CPC .................. *A63F 13/10* (2013.01); *A63F 13/12* (2013.01); *A63F 2300/534* (2013.01); *A63F 2300/538* (2013.01); *A63F 2300/6009* (2013.01); *A63F 2300/63* (2013.01)

(58) Field of Classification Search
None
See application file for complete search history.

(56) References Cited

U.S. PATENT DOCUMENTS 5,890,963 A    4/1999  Yen
6,473,084 B1 *  10/2002  Phillips et al. ................ 345/440
(Continued)

FOREIGN PATENT DOCUMENTS

WO    WO03053531 A1    7/2003

OTHER PUBLICATIONS

Balan et al., "Matrix: Adaptive Middleware for Distributed Multiplayer Games," retrieved at <<http://www.cs.cmu.edu/~rajesh/papers/middleware05.pdf>>, IFIP, 2005, pp. 392-402.
(Continued)

*Primary Examiner* — Paul A D'Agostino
(74) *Attorney, Agent, or Firm* — Alin Corie; Sandy Swain; Micky Minhas

(57) ABSTRACT

Partitioned artificial intelligence (AI) for networked gaming. An exemplary system splits the AI into a computationally lightweight server-side component and a computationally intensive client-side component to harness the aggregate computational power of numerous gaming clients. Aggregating resources of many, even thousands of client machines enhances game realism in a manner that would be prohibitively expensive on the central server. The system is tolerant of latency between server and clients. Deterministic and stateless client-side components enable rapid handoff, preemptive migration, and replication of the client-side AI to address problems of client failure and game exploitation. The partitioned AI can support tactical gaming navigation, a challenging task to offload because of sensitivity to latency. The tactical navigation AI calculates influence fields partitioned into server-side and client-side components by means of a Taylor-series approximation.

20 Claims, 10 Drawing Sheets

(56) References Cited

U.S. PATENT DOCUMENTS

| | | | |
|---|---|---|---|
| 7,287,052 B2 | 10/2007 | Chen et al. | |
| 7,372,463 B2 | 5/2008 | Anand | |
| 7,428,588 B2 | 9/2008 | Berstis et al. | |
| 7,774,335 B1* | 8/2010 | Scofield et al. | 707/709 |
| 7,797,421 B1* | 9/2010 | Scofield et al. | 709/224 |
| 7,828,657 B2 | 11/2010 | Booth | |
| 7,937,270 B2* | 5/2011 | Smaragdis et al. | 704/256 |
| 8,137,199 B2* | 3/2012 | Douceur | A63F 13/10 345/473 |
| 8,561,178 B2* | 10/2013 | Schluessler et al. | 726/22 |
| 2001/0055025 A1* | 12/2001 | Deering et al. | 345/611 |
| 2002/0015041 A1* | 2/2002 | Naegle et al. | 345/501 |
| 2003/0008712 A1* | 1/2003 | Poulin | 463/42 |
| 2004/0030556 A1* | 2/2004 | Bennett | 704/270 |
| 2004/0116186 A1 | 6/2004 | Shim et al. | |
| 2004/0133355 A1* | 7/2004 | Schneider | 702/19 |
| 2004/0143852 A1 | 7/2004 | Meyers | |
| 2005/0026692 A1* | 2/2005 | Dyl | 463/42 |
| 2005/0026697 A1 | 2/2005 | Balahura et al. | |
| 2005/0067493 A1* | 3/2005 | Urken | 235/386 |
| 2005/0071306 A1 | 3/2005 | Kruszewski et al. | |
| 2005/0225552 A1 | 10/2005 | Anand | |
| 2005/0288103 A1* | 12/2005 | Konuma | 463/42 |
| 2006/0026123 A1* | 2/2006 | Moore et al. | 707/2 |
| 2006/0046854 A1* | 3/2006 | Arevalo Baeza et al. | 463/42 |
| 2006/0053008 A1* | 3/2006 | Droppo et al. | 704/234 |
| 2006/0120619 A1* | 6/2006 | Avidan et al. | 382/276 |
| 2006/0179022 A1 | 8/2006 | Holland | |
| 2006/0203739 A1* | 9/2006 | Padmanabhan et al. | 370/252 |
| 2006/0258462 A1* | 11/2006 | Cheng et al. | 463/42 |
| 2007/0054717 A1 | 3/2007 | Youm et al. | |
| 2007/0097832 A1 | 5/2007 | Koivisto et al. | |
| 2007/0149279 A1* | 6/2007 | Norden et al. | 463/29 |
| 2007/0184903 A1 | 8/2007 | Liu et al. | |
| 2007/0214135 A1 | 9/2007 | Crivat et al. | |
| 2007/0293319 A1* | 12/2007 | Stamper et al. | 463/42 |
| 2008/0005332 A1 | 1/2008 | Pande et al. | |
| 2008/0098064 A1* | 4/2008 | Sherinian | 709/203 |
| 2008/0140595 A1 | 6/2008 | Park et al. | |
| 2008/0189789 A1* | 8/2008 | Lamontagne | 726/26 |
| 2008/0242422 A1* | 10/2008 | Kropivny | 463/42 |
| 2008/0242426 A1* | 10/2008 | Kraft et al. | 463/43 |
| 2008/0263207 A1* | 10/2008 | Popescu et al. | 709/226 |
| 2008/0293488 A1* | 11/2008 | Cheng et al. | 463/31 |
| 2009/0144059 A1* | 6/2009 | Yu et al. | 704/256.1 |
| 2009/0203449 A1 | 8/2009 | Douceur et al. | |
| 2010/0056276 A1* | 3/2010 | Silberstein | 463/36 |

OTHER PUBLICATIONS

Bharambe et al., "A Distributed Architecture for Interactive Multiplayer Games," retrieved at <<http://www.cs.cmu.edu/~ashu/papers/cmu-cs-05-112.pdf>>, Jan. 2005, 25 pages.

Hsu et al., "On the Design of Multiplayer Online Video Game Systems," available at least as early as Nov. 7, 2007, at <<http://viola.usc.edu/Research/alex_SPIEitcom03.pdf>>, 12 pages.

"Massively Multiplayer Online Games," retrieved at <<http://fortheloveofgames.net/games/articles/Massively-Multiplayer-Online-Games.html>>, FortheLoveofGames.net, 2006, 2 pages.

Final Office Action for U.S. Appl. No. 12/029,286, mailed on Oct. 4, 2011, John Douceur, "Partitioned Artificial Intelligence for Networked Games," 10 pages.

* cited by examiner

PARTITIONED ARTIFICIAL INTELLIGENCE FOR NETWORKED GAMES

RELATED APPLICATION

This application is a continuation of and claims priority to U.S. patent application Ser. No. 12/029,286, filed on Feb. 11, 2008, which is incorporated by reference herein.

COMPUTER PROGRAM LISTINGS

Four sets of C++ programming file listings used in accordance with the subject matter are provided in four Appendices after the Abstract on 5 sheets of paper and incorporated by reference into the specification. The C++ programming files are a C++ header for ideal computation of motion based on an aggregate vector field, a C++ source for ideal computation of motion based on an aggregate vector field, a C++ header for partitioned computation of motion, and a C++ source for partitioned computation of motion.

BACKGROUND

First-person shooter (FPS) games, massively multiplayer online games (MMOG), and other networked games frequently include automated computer players, or "bots", in addition to human players. The presence of bots in a game is intended to make the game more enjoyable for the human players. However, it is widely recognized that bots play worse than if they were controlled by state-of-the art artificial intelligence (AI). This is largely because the AI that controls each bot must be kept very lightweight and simple, so as to avoid overwhelming the computational resources of the gaming server. Games would be more enjoyable, and therefore more attractive to potential players, if bots could be made more intelligent.

FIG. 1 shows a conventional online gaming system 100 in which the gaming server runs multiple AIs controlling multiple bots in a game. It is common for gamers to complain of monsters 102, 104 that are so stupid as to make the game unchallenging and rather unentertaining. Current gaming AIs exhibit astonishingly simple behavior. When unaware of nearby players, a typical monster 102 either waits in a delineated region or roams along a predetermined path. When a player comes within a defined distance, the monster 102 launches a direct attack. When severely wounded, some monsters 102 will fight to the death, whereas others will try to retreat via a simple path. FIG. 1 shows two AIs, AI 1 and AI 2, running on the gaming server. Because the gaming server performs all of the AI computations for every bot in the game, as well as centrally managing all of the game state, the performance of the AIs is quite limited.

Despite popular belief, the fundamental problem is not that game developers cannot write better AI algorithms; rather, the problem is that the servers that host MMOGs have insufficient computing power to support the computational demands of thousands of even moderately sophisticated, concurrently running AIs. Adding more back-end server resources could solve the problem, but at a cost that would be prohibitive given MMOG operations economics.

Sophisticated AI calculations can be offloaded to clients only if several issues are addressed, including the availability of client CPU capacity, communication latency between clients and the server, the possible failure of client machines, and the risk of client exploitation.

Offloading computation to a client may induce a substantial communication delay, as work that was previously performed in the server's main loop is now distributed to clients, processed on those clients, and sent back to the server. Round-trip latency between access networks can reach 400 ms, and a 56K-dialup access network can add as much as 500 ms more. Although some aspects of AI, such as high-level strategic planning, may tolerate latencies that approach one second, it is not clear whether tactical-level AI can satisfactorily cope with such a network delay.

Client machines can also fail in various ways. They may crash or spontaneously reboot; network problems can cause intermittent disconnection; players may abruptly quit the game; or a competing client application might become active and leave little available CPU. Thus, the server cannot afford to rely on any particular client to perform any given computation.

Furthermore, in the absence of a secured execution platform, AI code that runs on a client machine can be modified by the machine's owner. The owner might weaken the AI to make monsters stupid and easy to kill, or strengthen the AI to make monsters smarter and readily able to kill competing players. The server cannot safely assume that clients will calculate results honestly.

SUMMARY

This disclosure describes partitioned artificial intelligence (AI) for networked gaming. An exemplary system splits the AI into a computationally lightweight server-side component and a computationally intensive client-side component to harness the aggregate computational power of numerous gaming clients. Aggregating resources of many, even thousands of client machines enhances game realism in a manner that would be prohibitively expensive on the central server. The system is tolerant of latency between server and clients. Deterministic and stateless client-side components enable rapid handoff, preemptive migration, and replication of the client-side AI to address problems of client failure and client tampering.

The partitioned AI can support tactical gaming navigation, a challenging task to offload because of sensitivity to latency. The tactical navigation AI calculates influence fields partitioned into server-side and client-side components by means of a Taylor-series approximation.

This summary is provided to introduce the subject matter of partitioned artificial intelligence for networked games, which is further described below in the Detailed Description. This summary is not intended to identify essential features of the claimed subject matter, nor is it intended for use in determining the scope of the claimed subject matter.

DESCRIPTION

Overview

Figure 1:
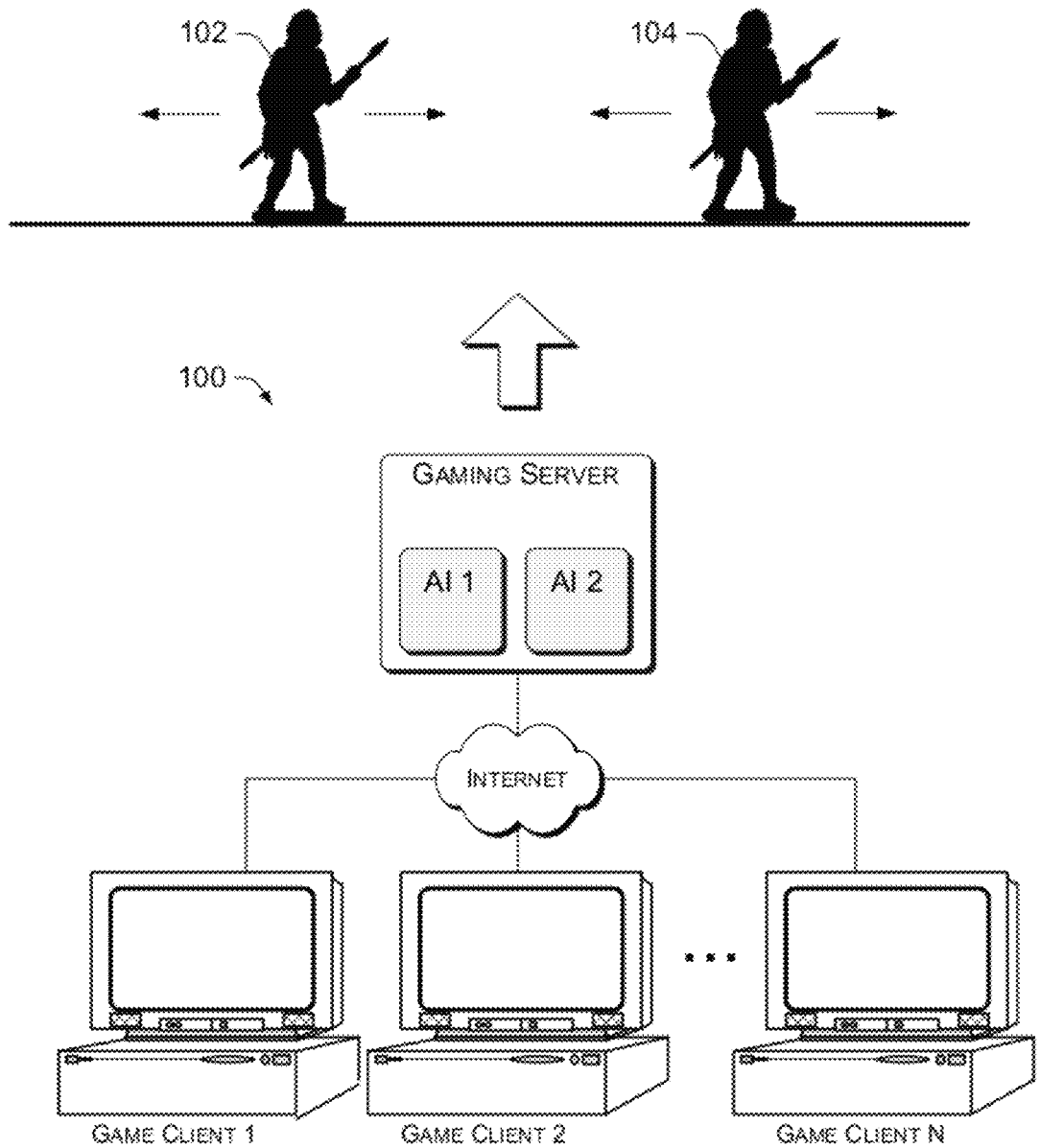
FIG. 1 is a diagram of a conventional implementation of artificial intelligence for gaming.

This disclosure describes partitioned artificial intelligence (AI) for networked games. Systems and methods split gaming AI into a lightweight server-side component that runs at the same speed as the gaming server's game loop, and a computationally intensive client-side component that performs complex calculations, e.g., for a local subset of the game's characters, in order to enhance game realism in a manner that would be prohibitively expensive on the central server. Each client is given a glimpse of the current game state in order to compute rich detail about that part of the game world that is accessible to the client. The system is tolerant of latency between server and clients because the complex computations at the client are relevant to more than one game frame at the server, e.g., for long term planning of internal game strategy.

The client-side AI can be cast as discrete, portable computation "jobs," deterministic and stateless, that can be offloaded by the server and interchangeably handled by any of the participating gaming clients without regard for previous computations or client states. Such discrete and standalone computation assignments enable rapid handoff, preemptive migration, and replication of the client-side AI to address problems of client failure and game exploitation.

In one implementation, the partitioned AI is a tactical navigation engine, spread between server and gaming clients. Tactical navigation is conventionally a challenging task to offload because it is highly sensitive to latency. The exemplary tactical navigation AI calculates influence fields of gaming characters, the calculations partitioned into server-side and client-side components by means of a Taylor-series approximation.

The exemplary improved gaming AI can be employed to make gaming characters, such as monsters, behave in more intelligent and interesting ways, thus improving the MMOG playing experience. One benefit of an exemplary system is that the partitioned AI does not require a radical restructure of MMOG architecture, but supplements and accelerates server-based computation by offloading components of AI onto client machines.

In several applications, partitioning the gaming AI is not without challenges. Such partitioning can add a substantial communication delay to code that normally executes within the gaming server's main loop. The partitioning may relocate critical functionality to clients that may fail or become disconnected. And the AI partitioning may make sensitive computations more readily exploitable by unscrupulous players who hack their client software.

Addressing the problem of latency, the exemplary partitioning splits the AI into a server-side component that retains critical tight-loop control and a client-side component, which in one implementation performs processor-intensive computation of tuning parameters for the server-side component.

In the case of the exemplary partitioned AI for navigation, tactical navigation is based on summed influence fields of the gaming characters. The gaming server offloads the bulk of the computational effort for determining realistic influence fields and influence field interactions as a two-dimensional Taylor-series approximation. Implementations of the exemplary system have demonstrated that partitioning the navigation AI is effective for providing enhanced game realism without loss of performance even with latencies of up to one second.

Exemplary System

Figure 2:
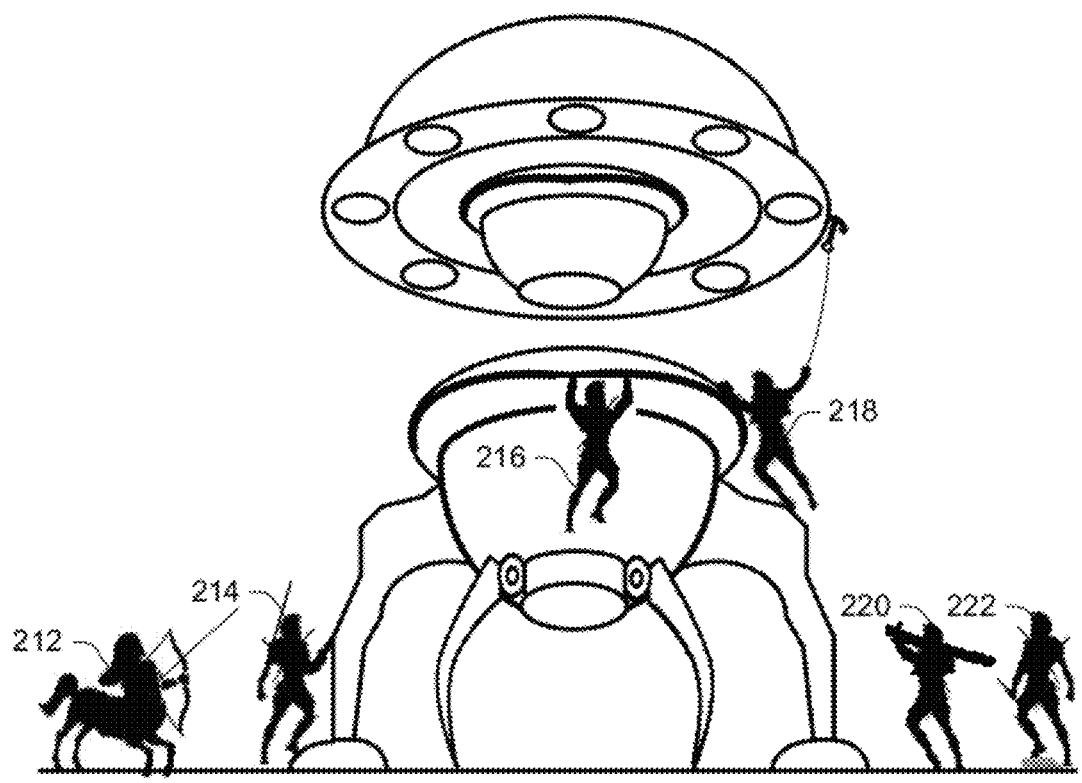
FIG. 2 is a diagram of an exemplary gaming system implementing partitioned artificial intelligence for gaming.
Figure 2:
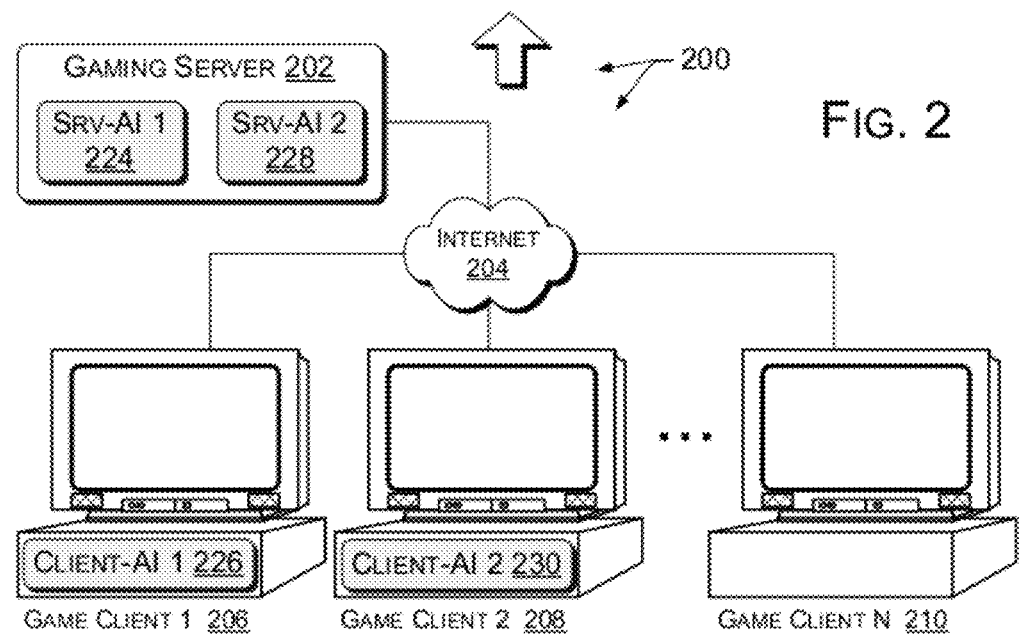

FIG. 2 shows an exemplary gaming system 200 employing the exemplary partitioned AI. The gaming system 200 includes a gaming server 202 connected via the Internet 204 or other network to multiple gaming clients 206, 208, 210. The game may include multiple AI modules, such as AI-1 and AI-2 to control multiple bot "monsters," adversaries, or other gaming characters 212, 214, 216, 218, 220, 222. Each type of AI included in the game is partitioned into a server-side component and a client-side component. For example, AI-1 is partitioned into a server-side AI engine, "SRV-AI 1" 224 and a client-side AI engine, "Client-AI 1" 226. Likewise, AI-2 is partitioned into a server-side AI engine, "SRV-AI 2" 228 and a client-side AI engine, "Client-AI 2" 230.

In some configurations, the gaming server 202 is co-located with one of the gaming clients, but still manages the state of the game. During play of the game, each game client 206 sends the server 202 information about what the client's local player is doing. In response, the gaming server 202 centrally updates the game state and sends information about the updated game state to the clients 206.

In the exemplary gaming system 200, the partitioned AI provides a MMOG in which monsters (e.g., bots 212) and other non-player characters display behavior that is complex, sophisticated, intelligent, conspiratory, and/or interesting. For example, automated bot monsters 212 or other gaming adversaries may travel in packs across a wide range and engage in useful or distracting activities rather than just milling around as in conventional games. Such bots 212, animated by the partitioned AI, are enabled to become aware of players by sight, sound, or smell, and may intelligently stalk their victims and pounce when unexpected. Sophisticated monsters 212 may work together, attacking the same target and coordinating their efforts. They may assess a group of players collectively, deciding whether to attack based on an assessment of comparative strength.

By partitioning the game AI and offloading the AI computation from the gaming server 202 to game clients (e.g., 206), aggregate resources of numerous participating client machines can enhance game realism in a way that would be prohibitively expensive on a central server. However, because offloading can add significant latency to a computation normally executing within a gaming server's main loop, the AI partitioning aims to split the AI into a critical, but lightweight server part and a merely supportive, but computationally complex client part. The server-side AI consists of high-frequency but (relatively) computationally simple components that retain critical tight-loop control, while the client-side AI consists of low-frequency but computationally intensive components 226, 230 offloaded to gaming clients 206, 208.

Thus, for games that include bots in addition to human players, the behavior of each bot is controlled by an AI that runs on the gaming server 202. The server-side AIs 224, 228 are kept simple and lightweight, as mentioned, so that they can run on the server 202 without overloading the server's computational resources. The client-side AIs 226, 230 can be more sophisticated because each client 206 performs computations for only a subset of the bots in the game, and the client 206 does not need to expend computational power on managing the game state. The server-side AI 224 performs the tasks that require rapid processing, such as targeting. Other tasks, particularly those that can benefit from more sophisticated computation, can be performed by the client-side AI 226.

The clients 206, 208, 210 also interact with the server 202 in the normal conventional manner, sending information about their local players to the server 202 and receiving updated information about the game state in return. This game state information is also used as input to the client-side AI computations. Furthermore, the server 202 may periodically send additional game state information to the clients 206, particularly if the client-side AI 226 requires more information about the game state than would normally be needed by the client 206 to display to the corresponding local player. This additional information is often necessary, when the client 206 is performing AI computations for a bot that is in a completely different area of the game world than the avatar of the client's local player.

Figure 3:
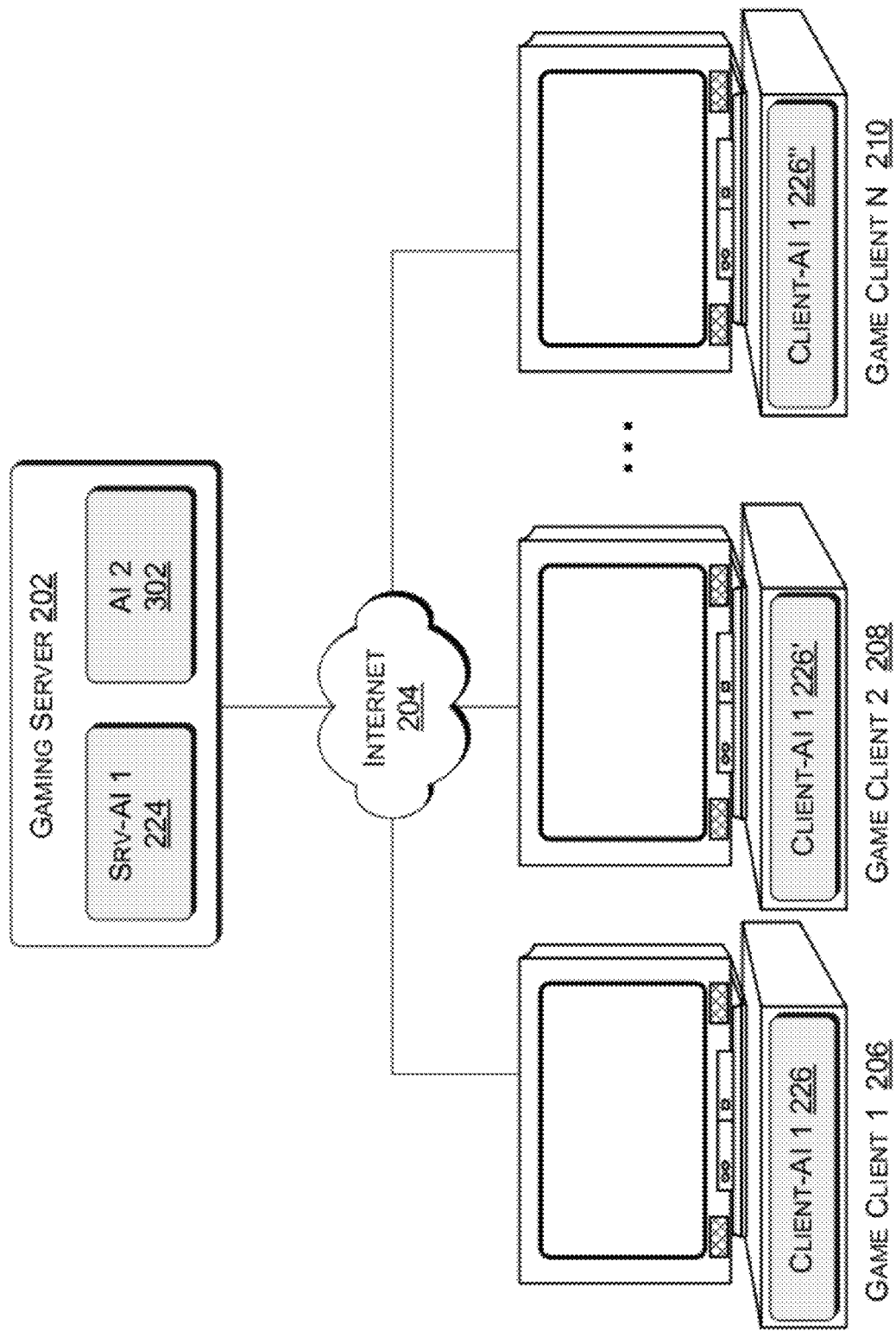
FIG. 3 is a block diagram of exemplary replication of client-side artificial intelligence for gaming.

As shown in FIG. 3, a particular client-side AI 226 may be replicated onto multiple clients. For example, client-side AI 1 226 is replicated on all three clients 206, 208, 210. AI 2 302 is depicted as a conventional, non-partitioned AI; however, AI 2 302 could also be partitioned and replicated, even onto some of the same clients that client-side AI 1 226 is replicated onto. If one or more of the clients fails, as long as at least one client 206 is properly running a replica, the server 202 will receive client AI support.

Exemplary Engines

Figure 4:
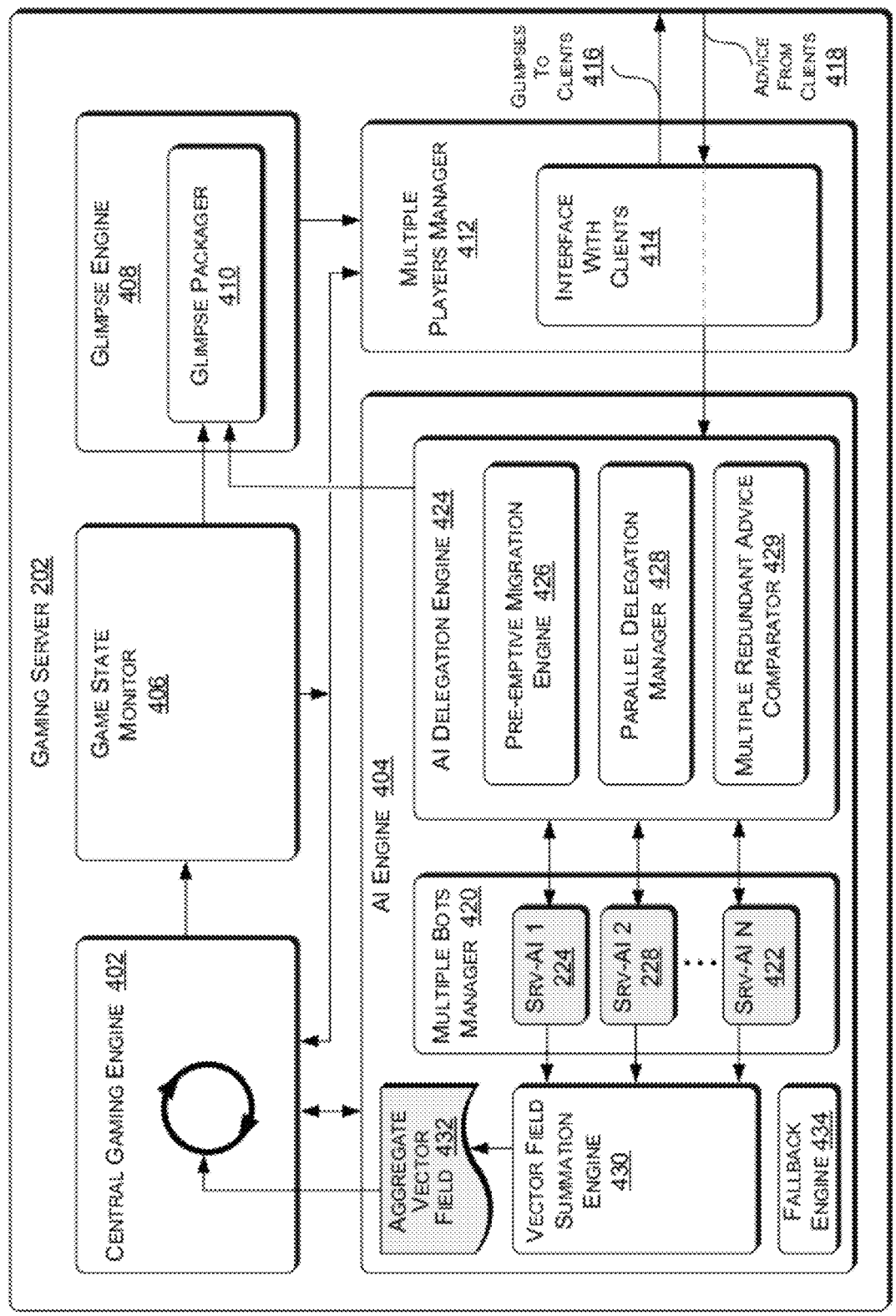
FIG. 4 is a block diagram of an exemplary gaming server that implements partitioned artificial intelligence for gaming.

FIG. 4 shows the exemplary gaming server 202 of FIGS. 2 and 3 in greater detail. The illustrated implementation is only one example configuration, for descriptive purposes. Many other arrangements of the components of an exemplary gaming server 202 are possible within the scope of the subject matter. Implementations of the gaming server 202 can be executed in various combinations of hardware and software.

The exemplary gaming server 202 includes a central gaming engine 402, an associated AI engine 404, a game state monitor 406, a glimpse engine 408 with glimpse packager 410 to send clients a view of a current game state, and a multiple players manager 412 that includes an interface 414 through which the gaming server 202 sends glimpses 416 of the game state to clients 206 and receives back advice 418 from the clients 206. The gaming server 202 may also optionally include an engine for determining the processing power or "system information" of particular gaming clients 206, in order to determine the magnitude of client-side AI calculations that a given client 206 can handle.

The AI engine 404 may further include a multiple bots manager 420 that includes server-side AI's, for example, server-side AI 1 224, server-side AI 2 228, . . . , and server-side AI "N" 422. In the illustrated implementation, the AI delegation engine 424 handles outgoing AI delegation as well as processing of incoming advice 418 from clients, thus the AI delegation engine 424 includes a pre-emptive migration engine 426, a parallel delegation manager 428, and a multiple redundant advice comparator 429. Finally, the AI engine 404 includes a vector field summation engine 430 to produce the aggregate vector field 432, and a fallback engine 434 for when clients fail to send back any advice 418 to the gaming server 202.

Figure 5:
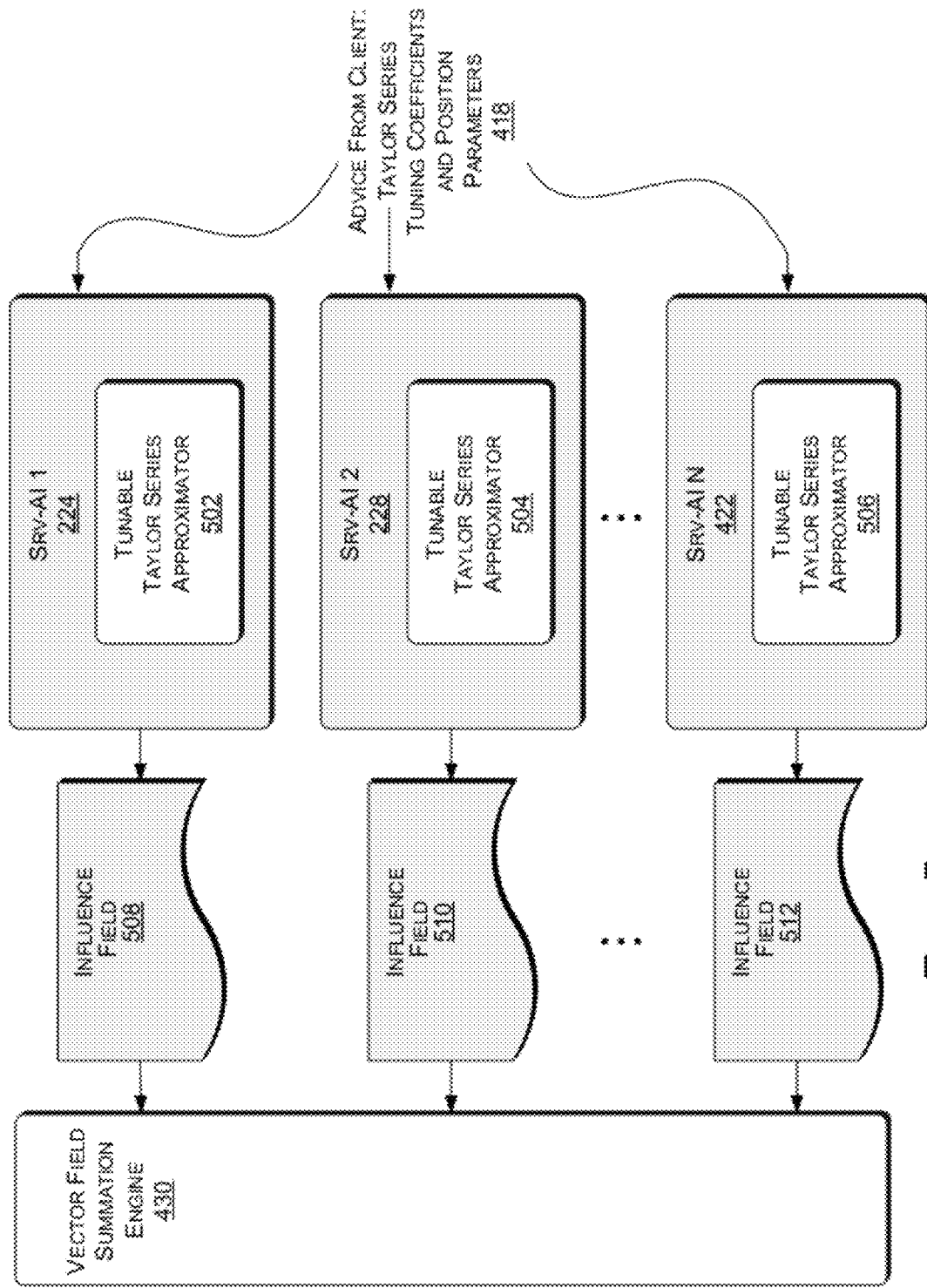
FIG. 5 is a block diagram of exemplary influence field production in a gaming server that implements partitioned artificial intelligence for gaming.

In an implementation in which the partitioned AI is used for tactical gaming navigation, FIG. 5 shows a detail of some of the server-side AI components: 224, 228, 422. Each of the server-side AI components includes a respective tunable Taylor-series approximator 502, 504, 506. The respective Taylor-series approximators, when tuned by advice 418 received from the client-side AI components (e.g., 226, 230), provide corresponding influence fields 508, 510, . . . , 512, which are then aggregated by the vector field summation engine 430 into the aggregate vector field 432.

Before describing operation of the exemplary gaming server 202, a client-side AI engine 226 will now be described.

Figure 6:
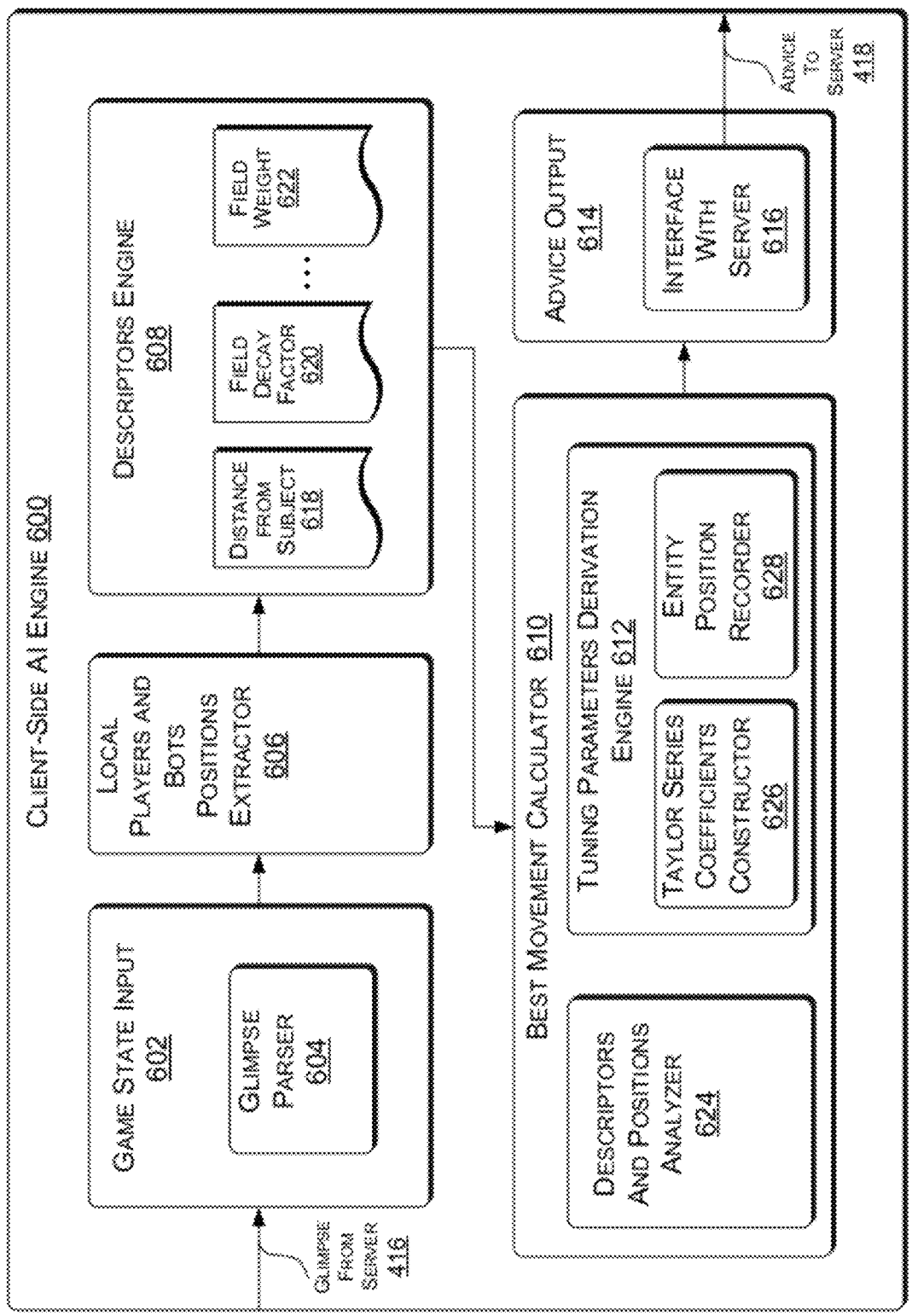
FIG. 6 is a block diagram of an exemplary client-side artificial intelligence engine.

FIG. 6 shows an exemplary client-side AI engine 600, implemented in a tactical gaming navigation context. The illustrated implementation is only one example configuration, for descriptive purposes. Many other arrangements of the components of an exemplary client-side AI engine 600 are possible within the scope of the subject matter. Implementations of the client-side AI engine 600 can be executed in various combinations of hardware and software.

The illustrated client-side AI engine 600 includes a game state input 602, including a glimpse parser 604; a local players and bots positions extractor 606, a descriptors engine 608, a best movement calculator 610, a tuning parameters derivation engine 612, and an advice output 614 that includes an interface 616 with the gaming server 202.

The descriptors engine 608 receives the game state information from the glimpse parser 604 and derives and/or tracks descriptors associated with players and bots in the game and their respective influence fields, such as distance from player subject 618, field decay factor 620, . . . , and field weight 622. The best movement calculator 610 includes a descriptors and positions analyzer 624, which together with the tuning parameters derivation engine 612 performs the bulk of the complex AI calculation being offloaded from the gaming server 202. When the AI is partitioned via a Taylor-series approximation, the tuning parameters derivation engine 612 may include a Taylor-series coefficients constructor 626 and an entity position recorder 628. The entity position recorder 628 tracks new positions of players and bots after the best movement calculations in order to provide the server-side AI component 224 at the gaming server 202 with a relevant positional frame of reference for the Taylor-series coefficients being sent back as advice 418 to the gaming server 202.

Operation of the Exemplary System

One key feature of the exemplary partitioned gaming AI is a built-in leeway between the critical tight-loop control of the game maintained by the server-side AI 224 and the complex computations that the server-side AI 224 requisitions from the client side AI 226 at the gaming clients 206. That is, instead of being used to determine only one game frame, the complex calculations that are offloaded to client machines can be used for a longer timeframe, thereby providing delay tolerance between the server 202 and clients 206. In one implementation, the split between the client-side AI 226 and server-side AI 224 is structured so that the advice 418 is useful to the server-side AI 224 over multiple game frames. Thus, the server-side AI 224 can tolerate somewhat stale advice. Furthermore, to tolerate cases in which the server-side AI 224 receives no advice for an extended period of time, the server-side AI 224 has a fallback mode, or the fallback engine 434, in which the server-side AI 224 operates without need for advice 418. In the fallback mode, the server-side AI 224 may act somewhat less intelligently, but does not behave pathologically, i.e., entities in the game still behave plausibly. Because the server-side AI 224 can keep operating without the client-side AI 226, the computations of the client-side AI 226 are dubbed "advice."

The output of each client-side AI 226, the advice 418, is sent from the client-side AI 226 to tune the behavior of a server-side AI 224. That is, the clients 206, 208, 210 send their advice 418 back to the server 202, and the server 202 applies the advice 418 from each client 206 to the appropriate server-side AI 224.

The split between the client-side AI 226 and server-side AI 224 is preferably structured so that the client-side AI 226 is stateless, meaning that each computation is independent of other computations. This allows the gaming server 202 maximum freedom to select which clients 206 to delegate computations to.

The split between the client-side AI 226 and the server-side AI 224 is also preferably structured so that the client-side AI 226 is deterministic: i.e., given the same glimpse of the game state, the client-side AI 224 will produce identical advice 418. By replicating the same stateless and deterministic client-side AI 226 on multiple clients 206, the parallel delegation manager 428 assures that a high level of fault-tolerance can be achieved in the exemplary gaming system 200. Even complex fault behaviors, such as those resulting from users maliciously modifying their client machines, can be tolerated. In particular, the gaming server 202 can wait for multiple replies and use plurality voting to determine which advice is correct. For example, referring to FIG. 3, if client 1 206 calculates incorrect advice due to a faulty client-side AI 1 226, then the gaming server 202 will receive incorrect advice from client 1 206, correct advice from client 2 208, and correct advice from client 3 210. Since the server received matching advice from clients 2 and 3, the server can use this advice safely and ignore the faulty advice from client 1 206.

From the perspective of the server-side AI 224, as introduced above, the glimpse engine 408 sends a glimpse 416 of the game state to the client 206, and the client 206 responds with advice 418. The glimpse packager 410 may combine game state information with the client-side AI assignment to be computed by the client 206. A glimpse 416 is a snapshot of limited scope, containing data obtained by the game state monitor 406, of proximate relevance to the AI's subject entity, i.e., the bot being controlled or predicted. The game state input 602 receives the glimpse 416 as input for the client-side AI computation. The output of the client-side AI computation is advice 418 for the server-side AI 224, typically in the form of parameters and coefficients. Because glimpses 416 and advice 418 consume bandwidth, it is desirable to keep them of small data size.

Stateless client-side AI 226 means that each glimpse-advice computation is independent of prior computations, with no client-side state carried forward. If a client 206 fails or becomes disconnected, and the server 202 hands off the computation to another client 208, the new client 208 can immediately pick up where the previous one left off. In addition, the server 202 can temporally limit the effect of each client 206 on the server-side AI 224 by assigning successive computations for the same subject to different clients. It can do this, e.g., by signaling the pre-emptive migration engine 426 to migrate to the client-side AI 226 of another client 208.

There are also advantages to designing the client-side AI 226 to be deterministic, meaning that identical glimpses 416 produce identical advice 418. To tolerate failures and exploits, the parallel delegation manager 428 can redundantly issue the same glimpse 416 and AI tasks to multiple clients 206, 208, 210 effectively replicating the client-side AI 226. To deal with simple failures, the multiple redundant advice comparator 429 can accept the first advice it receives. Alternatively, to deal with attempted client exploits, the multiple redundant advice comparator 429 can wait for multiple replies and use plurality voting to determine the correct advice 418; however, this may increase latency as the server 202 waits for replies from multiple clients 206, 208, 210. If the client-side AI computation needs to include randomness, the seed for the random-number generator can be selected by the server 202 and sent with the glimpse 416 to clients 206, thereby keeping the client-side AI 226 deterministic.

Exemplary Tactical Gaming Navigation

In one implementation, partitioned AI is applied to the task of tactical navigation. As mentioned, this is a particularly challenging task because it is highly sensitive to latency. Yet, the exemplary AI calculations can be effectively partitioned in a manner that tolerates the latency of remote computation.

The conventional approach to game-AI navigation is first to select a goal and then to move toward that goal via a series of predetermined waypoints. If the goal is an opponent, then when the opponent comes within a defined range, navigation switches to a mode of random selection among preprogrammed attack movements such as charging, feinting, and strafing. The main benefit of this conventional approach is computational efficiency, since the complex logic for selecting a new goal is performed sporadically rather than reevaluated on every frame, and detailed path calculations are performed offline prior to game execution However, the conventional approach has at least two significant weaknesses. First, it only allows for one goal at a time. In contrast, humans can simultaneously weigh several goals and devise a path that optimizes over all of them. Second, the conventional approach does not readily adapt to quickly changing circumstances, such as the virtual locations of teammates and opponents. Consequently, the conventional approach cannot execute interesting and intelligent movement patterns, such as complex retreating behavior.

The exemplary partitioned AI system 200, however, addresses the two conventional weaknesses noted above with a more flexible approach to tactical game navigation. Rather than navigating toward a single selected goal, the exemplary gaming system 200 calculates the aggregate vector field 432 that characterizes the collective influence of all entities in a vicinity, and then calculates a best way to move in the direction indicated by the field 432. The aggregate vector field 432 optimizes over both the explicit primary goal and implicit secondary goals, and can be readily recalculated as entities move. From the subject's perspective, each other entity exudes an attractive or repulsive radial influence field with a magnitude, as given in Equation (1), of:

$$\|v\| = |W| d^{-m} \tag{1}$$

where d is distance 618 from the subject, m is a decay factor 620, and W is a weight 622. Most entities are attractive, such as the primary goal, targeted opponents, weapons, ammunition, and health packs, etc. Some entities may be repulsive, such as a powerful opponent who is currently attacking the subject.

The aggregate vector field 432 is a sum of the influence fields from nearby entities. For a subject at point p in virtual space, the aggregate field f from a set of N entities can be calculated, as in Equation (2), as:

$$f(p) = \sum_{k=1}^{N} W(k) \|p_k - p\|^{-m(k)-1} (p_k - p) \tag{2}$$

where the weight W 622 and decay factor m 620 are functions that vary per entity. In general, the weight 622 and decay functions 620 are affected by the state of the subject; for example, as the subject's health decreases, it becomes more repulsed by attacking opponents and more attracted by health packs. The above expression for f is reformulated as Equation (3):

$$f(x, y) = \sum_{k=1}^{N} W(k)((x_k - x)^2 + (y_k - y)^2)^{-m(k)/2 - 1/2}((x_k - x)i + (y_k - y)j) \quad (3)$$

where i and j respectively represent unit vectors in the X and Y dimensions. By simplifying the latter formulation, the cost of calculating the aggregate vector field 432 is five additions, six multiplications, and one exponentiation per entity in the subject's vicinity.

Figure 7:
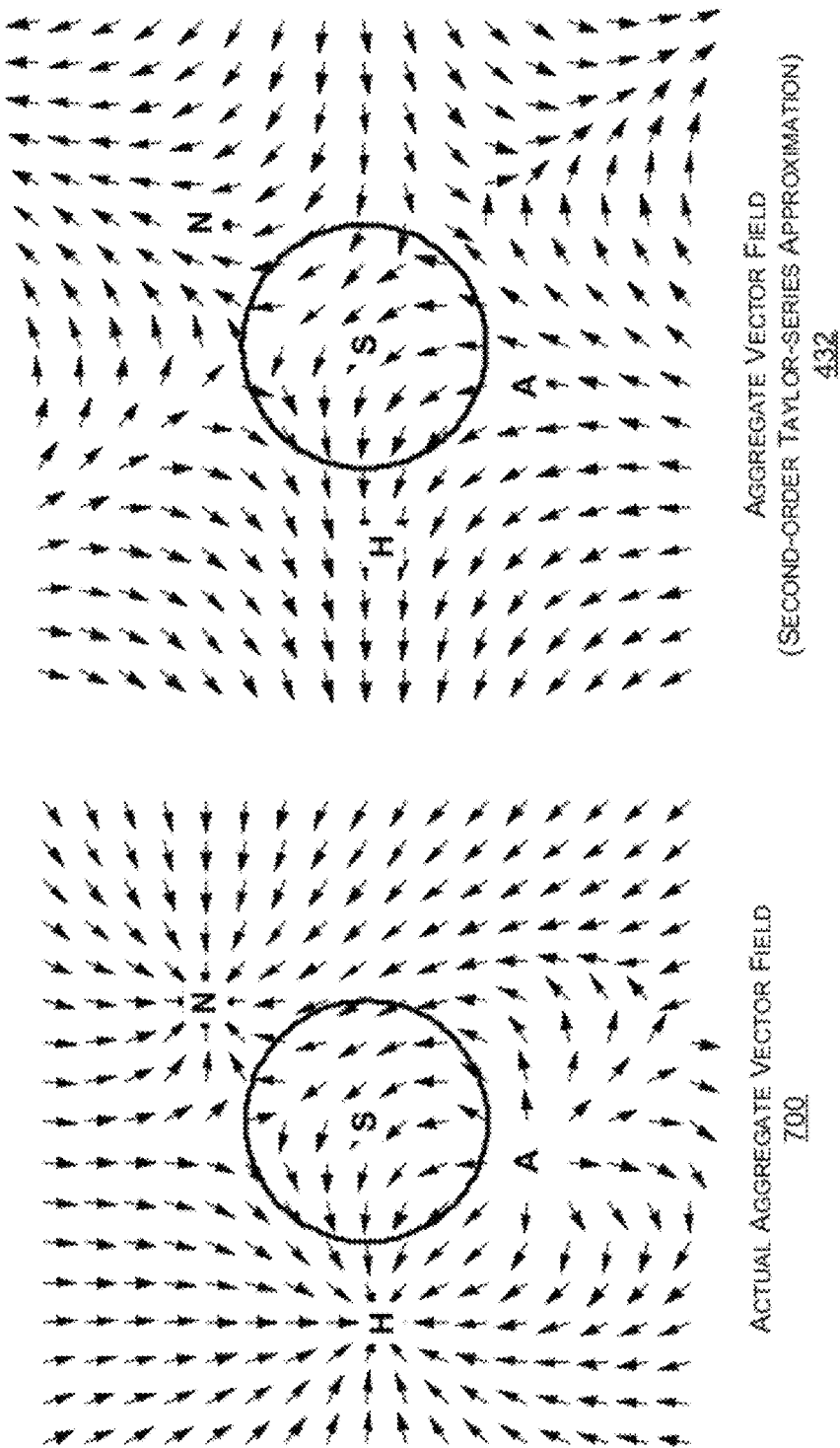
FIG. 7 is a diagram of exemplary aggregate vector fields.

FIG. 7(*a*) shows an example actual aggregate vector field 700 (aggregate influence field). The subject, "S," is repelled by the attacking enemy "A"; attracted to the other non-attacking enemy "N"; and even more attracted to the health pack "H".

Offloading: Taylor-Approximate Fields

The cost of calculating an approximate aggregate vector field 432 is proportional to the count of entities in the area. To offload the bulk of this effort to a client, the exemplary gaming system 200 uses the exemplary AI partitioning Specifically, in the server-side AI 224, the calculation of the actual influence field f is replaced with the calculation of a second-order two-dimensional Taylor-series approximated vector field 432, as in Equation (4):

$$f(\tilde{x}+\Delta x, \tilde{y}+\Delta y) \approx (A_0 + A_1\Delta x + A_2\Delta y + A_3\Delta x^2 + A_4\Delta y^2 + A_5\Delta x\Delta y)i + (B_0 + B_1\Delta x + B_2\Delta y + B_3\Delta x^2 + B_4\Delta y^2 + B_5\Delta x\Delta y)j \quad (4)$$

The cost of this computation is merely 12 additions and 13 multiplications, irrespective of the count of entities in the vicinity. The Taylor-series coefficients, $A_0$ to $A_5$ and $B_0$ to $B_5$, are computed by the client-side AI 226, based on a glimpse 416 of the game state provided by the server 202 when the subject is at point $(\tilde{x}, \tilde{y})$ in virtual space.

FIG. 7(*b*) illustrates the exemplary 2D Taylor-series approximated vector field 432 corresponding to the actual aggregate vector field 700 in FIG. 7(*a*). Near the subject's position, e.g., within the region highlighted by the circle, the Taylor-series approximated vector field 432 closely follows the actual influence field 700.

The visual edges of FIG. 7(*b*), however, show that the exemplary Taylor-series approximated vector field 432 can be wildly wrong at positions far from the subject being controlled by the particular AI. This is because the Taylor-series accuracy diminishes with distance from the location point of the subject. Therefore, as the subject moves away from this point over time, the advice 418 returned by the client-side AI 226 becomes less valuable. In addition, even if the subject stays in place, the positions of the other entities change, rendering the advice 418 stale.

Exemplary Code

The server-side AI 224 selects which direction to move each bot by means of the aggregate vector field 432, as shown in FIG. 7. The vector field summation engine 430 calculates the aggregate vector field 432 as the sum of influence fields 508, 510, 512 radiating from entities in the game. From the perspective of a bot that the AI controls (e.g., subject "S" in FIG. 7), each entity radiates a field that decays with distance from the entity. This bot is made by the server-side AI to move in the direction of the vector field in the location it is currently standing. Calculation and use of this aggregate vector field 432 are illustrated by the code in exemplary Code Tables A and B, in Appendices A and B, respectively.

Code Tables A and B present a class that calculates the ideal best direction for a bot to move, as a function of the bot's current position, the position of other entities in the game 618, and a weight 622 and decay rate 620 of the influence fields from each of the other entities. The constructor for the object takes an array of entity descriptors 618, 620, . . . , 622, each of which indicates the position of the entity, the weight (strength) 622 of the field at the point of emanation, and the exponential decay rate 620 of the field. In one implementation, the constructor merely stores pointers to this information for later use.

A bestDirection function calculates the ideal next direction for the bot to move, as a function of the bot's current position. The function loops over all entities, calculates a vector from the entity to the bot, exponentially decays the weight of the entity's field by the distance between the entity and the bot, and accumulates the resulting vectors over all entities. At the end, the exemplary code divides out the magnitude to produce a unit vector indicating the best direction. As can be seen by inspecting the exemplary code itself, the cost of calculating the aggregate vector field 432 is five additions, six multiplications, and one exponentiation per entity.

Code Tables C and D in Appendices C and D, respectively, present a class that calculates the best direction for a bot to move, using the exemplary AI partitioning. The constructor 626 therein illustrates the client-side AI computations for tactical navigation. The constructor 626 takes an array of entity descriptors 618, 620, . . . , 622, each of which indicates the position 618 of the entity, the weight (strength) 622 of the field, and the exponential decay rate 620 of the field. The constructor also takes the current location of the bot under control. In one implementation, the constructor calculates twelve scalar values, which are coefficients for the two-dimensional Taylor-series approximation of the aggregate vector field 432. The Taylor-series approximation is fairly accurate for locations that are relatively near to the calculation point.

Taylor-series approximations are well known in the art, so they will not be unduly described here. The exemplary Code Tables in the Appendices clearly illustrate the mathematics involved in producing the coefficients, by looping over all of the entities. The tuning parameters derivation engine 612 stores these coefficients, and the entity position recorder 628 stores in the object the location of the bot at the moment the calculation was made.

The corresponding bestDirection function for exemplary Code Tables C and D illustrates the server-side AI 224 computations for tactical navigation. The bestDirection function calculates the next direction for the bot to move, as a function of the bot's current position. This function employs a Taylor-series approximation, so it need not loop over all entities. Instead, it performs a simple computation involving 12 additions and 13 multiplications, irrespective of the count of entities. The code divides out the magnitude to produce a unit vector indicating the best direction.

Exemplary Methods

Figure 8:
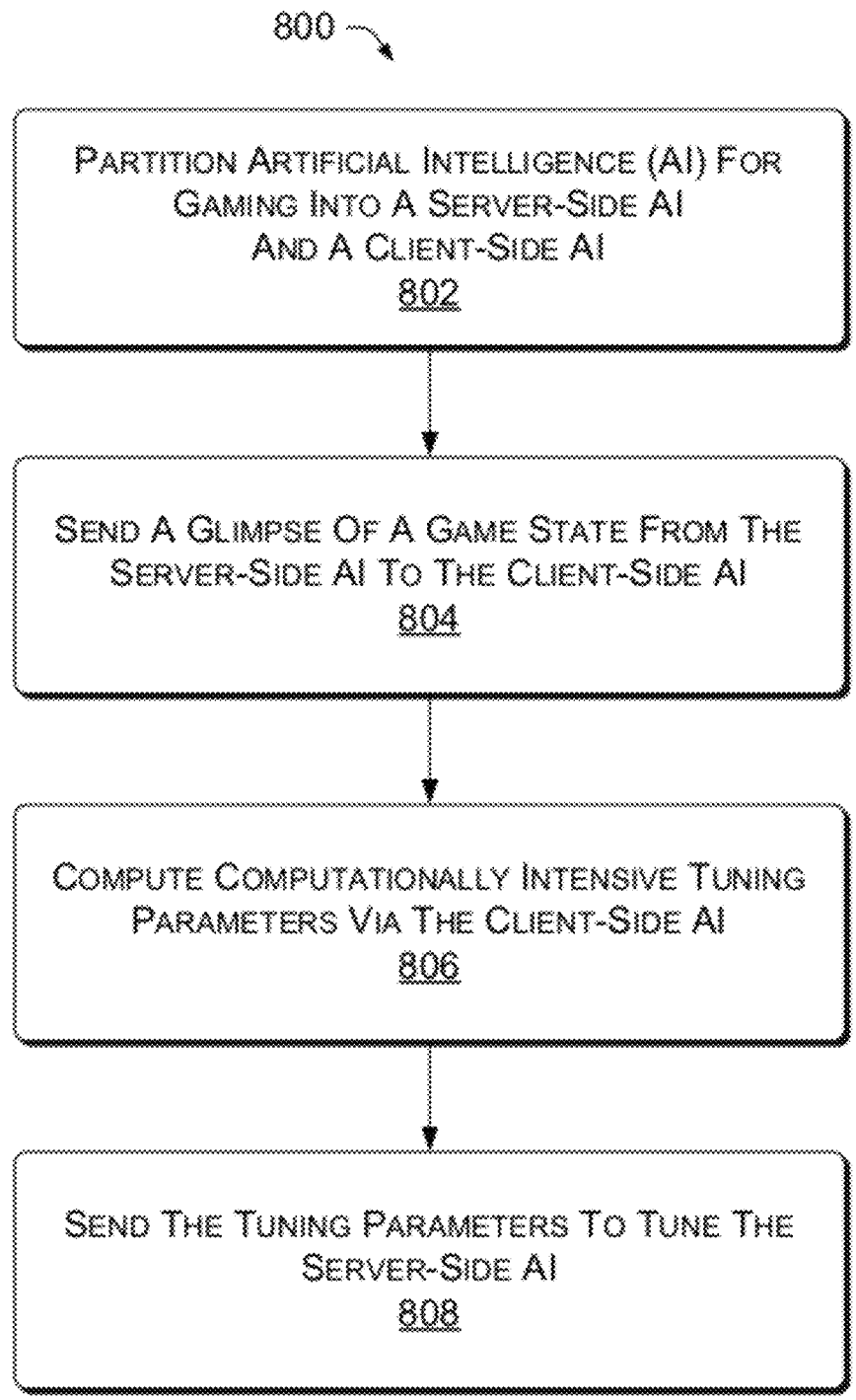
FIG. 8 is a flow diagram of an exemplary method of partitioning artificial intelligence for gaming.

FIG. 8 shows an exemplary method 800 of partitioning artificial intelligence (AI) for gaming. In the flow diagram, the operations are summarized in individual blocks. The exemplary method 800 may be performed by combinations of hardware, software, firmware, etc., for example, by components of the exemplary gaming server 202 and client-side AI engine 600.

At block 802, artificial intelligence (AI) for gaming is partitioned into a server-side AI component and a client-side AI component. The server-side AI is computationally lightweight and maintains tight game-loop control. However, the server-side AI is tunable, and offloading complex computation of the tuning parameters is one factor that keeps the server-side AI lightweight.

At block 804, a glimpse of a game state is sent from the server-side AI component to the client-side AI component. The glimpse need not be comprehensive, but discloses enough of the game state so each a client can compute rich detail about the part of the game world that is accessible to the client.

At block 806, computationally intensive tuning parameters are calculated via the client-side AI component. The client-side AI can bring concentration and processing power to bear on the client's limited corner of the game world that is in play. Specifically, the client's processing power can be used to calculate cunning and entertaining behavior and tactics for automated players and local bots in the game.

At block 808, the tuning parameters are sent to tune the server-side AI component. The server-side AI is intentionally constructed to be computationally simple and non-intensive, so that once the tuning parameters are plugged in, the server-side AI can implement sophisticated bot behavior and intelligence in real time, in lockstep with the game, as it is being played by online gamers.

Figure 9:
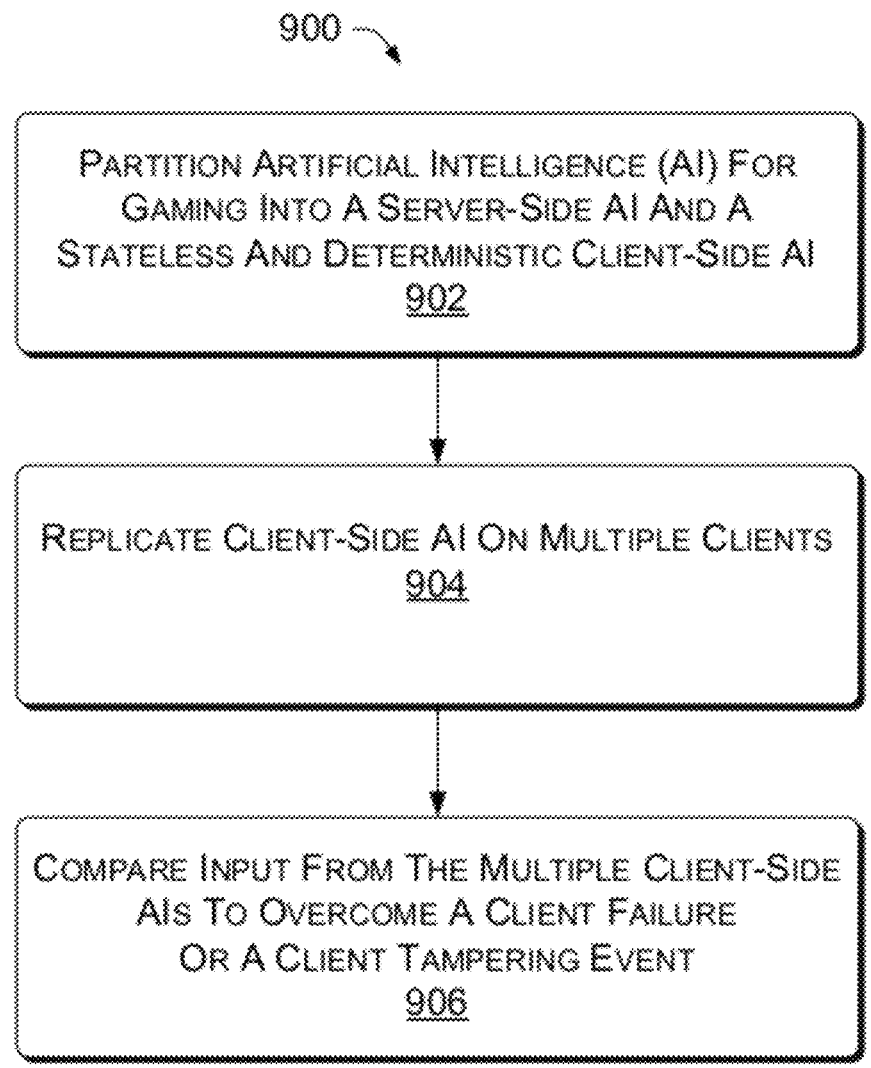
FIG. 9 is a flow diagram of an exemplary method of overcoming client failure and tampering when implementing partitioned artificial intelligence for gaming.

FIG. 9 shows an exemplary method 900 of overcoming client failure/tampering when partitioning gaming AI. In the flow diagram, the operations are summarized in individual blocks. The exemplary method 900 may be performed by combinations of hardware, software, firmware, etc., for example, by components of the exemplary gaming server 202 and client-side AI engine 600.

At block 902, AI for gaming is partitioned into a server-side AI and a stateless and deterministic client-side AI. By making each client-side AI computation independent of other computations and independent of previous client states, the client-side AI is portable among clients, or from the standpoint of the server-side AI, clients can be selected interchangeably to solve a given computational offload.

At block 904, the client-side AI is replicated on multiple clients. Since the client-side AI is portable and the computations can be completely divorced from the local gaming of the client that is computing the client-side AI, a given offload can be redundantly replicated across multiple clients.

At block 906, inputs from the multiple client-side AIs are compared in order to overcome a client failure or a client tampering event. The comparison provides several features to the server-side AI: an ability to choose the first return of client-side results to optimize speed; an ability to ignore failed or disconnected clients; or an ability to compare multiple instances of returned advice from the clients in order to reject advice that does not match a consensus of the other clients.

Figure 10:
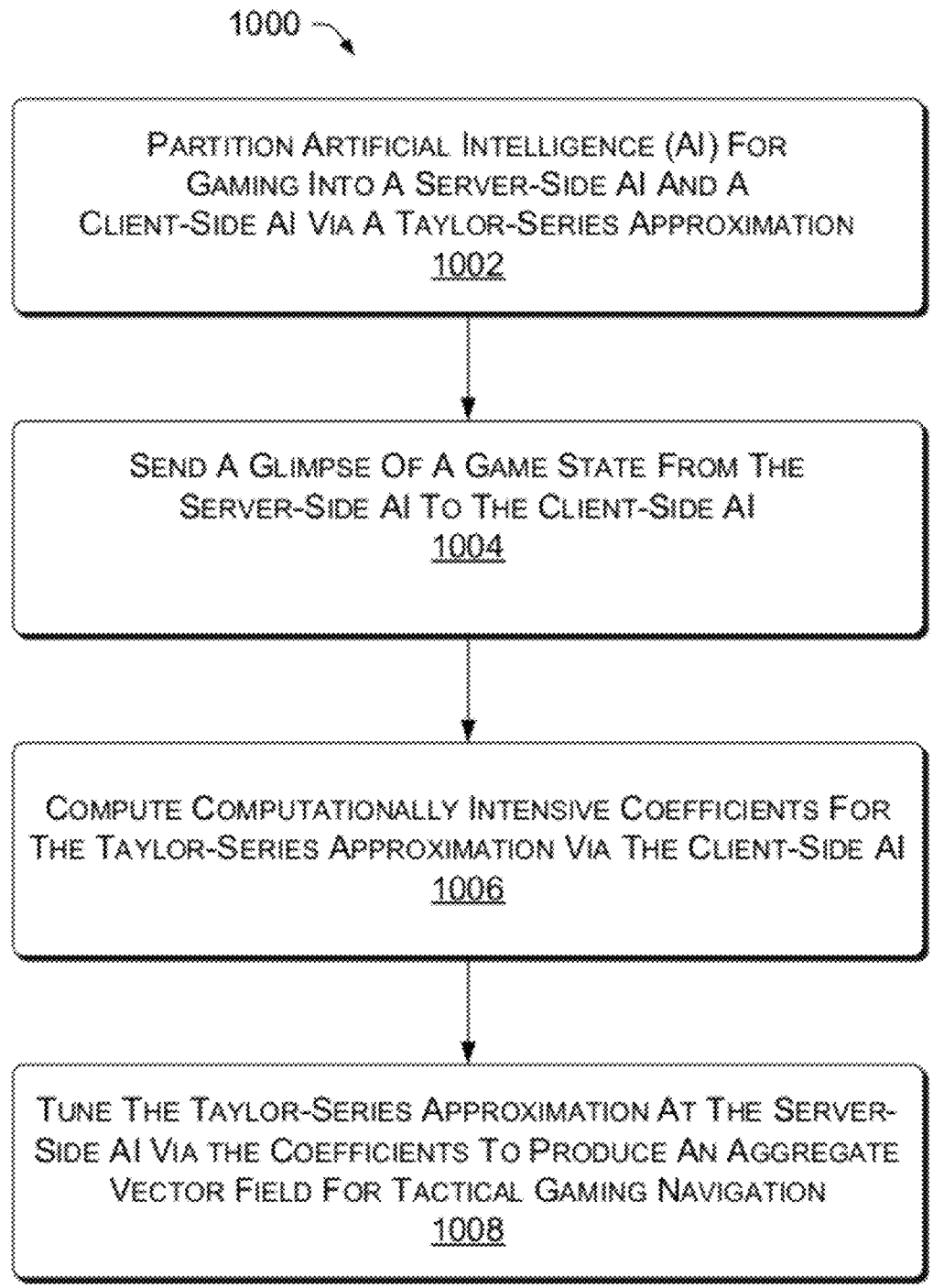
FIG. 10 is a flow diagram of an exemplary method of partitioning artificial intelligence for gaming via a Taylor-series approximation.

FIG. 10 shows an exemplary method 1000 of partitioning gaming AI via a Taylor-series approximation. In the flow diagram, the operations are summarized in individual blocks. The exemplary method 1000 may be performed by combinations of hardware, software, firmware, etc., for example, by components of the exemplary gaming server 202 and client-side AI engine 600.

At block 1002, AI for gaming is partitioned into a server-side AI and a client-side AI. The Taylor-series approximation effectively partitions the gaming AI by dividing the total AI task into the two parts, consisting of solving a version of the Taylor-series using coefficients, and computing the coefficients themselves.

At block 1004, a glimpse of a game state is sent from the server-side AI to the client-side AI. The glimpse can be transmitted efficiently to the client because the glimpse need only consist of game state parameters relevant to a local part of the game.

At block 1006, computationally intensive coefficients are computed at the client-side AI for the Taylor-series approximation. Taylor-series approximations provide an elegant way to partition gaming AI, because very little data—just the coefficients—are transferred from the client-side AI to the server-side AI, and yet providing the coefficients to the server-side AI has a profound effect on the game.

At block 1008, the Taylor-series approximation at the server is tuned via the coefficients in order to produce an aggregate vector field for tactical gaming navigation. The server-side AI has at hand, and can readily use in real time, the aggregate influence field that contains a well-calculated summary of the influences and potential interactions of the bots and other non-player entities in the game. The aggregate influence field is carefully crafted via intensive computation at the clients, with computational care that the server itself cannot perform while the game is live online.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

APPENDIX A

Code Table A: C++ header for ideal computation
of motion based on aggregate vector field:

```cpp
class DC_Ideal
{
public:
    DC_Ideal( field_pt_t* objArray, int objCount );
    void bestDirection( vec3_t& nextDir, vec3_t& currPos );
private:
    field_pt_t* objArray;
    int objCount;
};
```

APPENDIX B

Code Table B: C++ source for ideal computation
of motion based on aggregate vector field:

```cpp
DC_Ideal::DC_Ideal( field_pt_t* objArray, int objCount)
{
    this->objArray = objArray;
    this->objCount = objCount;
}
void
DC_Ideal::bestDirection( vec3_t& nextDir, vec3_t& currPos )
{
    double x = currPos[0];
    double y = currPos[1];
    double f = 0.0;
    double g = 0.0;
    for (int i = 0; i < objCount; i++)
    {
        double xi = objArray[i].pos[0];
        double yi = objArray[i].pos[1];
        double wi = objArray[i].weight;
        double mi = objArray[i].decay;
        double ji = x - xi;
        double ki = y - yi;
        double ji2 = ji * ji;
        double ki2 = ki * ki;
        double hi2 = ji2 + ki2;
        double t0 = wi * pow(hi2, -0.5 - 0.5 * mi);
        f += ji * t0;
```

APPENDIX B-continued

Code Table B: C++ source for ideal computation of motion based on aggregate vector field:

```
        g += ki * t0;
    }
    double mag = sqrt(f*f + g*g);
    nextDir[0] = float(f / mag);
    nextDir[1] = float(g / mag);
}
```

APPENDIX C

Code Table C: C++ header for partitioned computation of motion:

```
class DC_Plan
{
public:
    DC_Plan( vec3_t& currPos, field_pt_t* objArray, int objCount );
    void bestDirection( vec3_t& nextDir, vec3_t& currPos );
private:
    double x_bar;
    double y_bar;
    double f_bias;
    double f_x;
    double f_y;
    double f_x2;
    double f_y2;
    double f_xy;
    double g_bias;
    double g_x;
    double g_y;
    double g_x2;
    double g_y2;
    double g_xy;
};
```

APPENDIX D

Code Table D: C++ source for partitioned computation of motion:

```
DC_Plan::DC_Plan( vec3_t& currPos, field_pt_t* objArray, int objCount)
{
    x_bar = currPos[0];
    y_bar = currPos[1];
    f_bias = 0.0;
    f_x = 0.0;
    f_y = 0.0;
    double f2_x2 = 0.0;
    double f2_y2 = 0.0;
    f_xy = 0.0;
    g_bias = 0.0;
    g_x = 0.0;
    g_y = 0.0;
    double g2_x2 = 0.0;
    double g2_y2 = 0.0;
    g_xy = 0.0;
    for (int i = 0; i < objCount; i++)
    {
        double xi = objArray[i].pos[0];
        double yi = objArray[i].pos[1];
        double wi = objArray[i].weight;
        double mi = objArray[i].decay;
        double ji = x_bar - xi;
        double ki = y_bar - yi;
        double ji2 = ji * ji;
        double ki2 = ki * ki;
        double hi2 = ji2 + ki2;
        double t0 = wi * pow(hi2, -0.5 - 0.5 * mi);
        double t1 = t0 / hi2;
        double t2 = t1 / hi2;
        double u0 = -ji * (1.0 + mi);
        double u1 = -ki * (1.0 + mi);
        f_bias += ji * t0;
```

APPENDIX D-continued

Code Table D: C++ source for partitioned computation of motion:

```
        f_x += (ki2 - mi * ji2) * t1;
        f_y += u1 * ji * t1;
        f2_x2 += u0 * (3.0 * ki2 - mi * ji2) * t2;
        f2_y2 += u0 * (ji2 - (2.0 + mi) * ki2) * t2;
        f_xy += u1 * (ki2 - (2.0 + mi) * ji2) * t2;
        g_bias += ki * t0;
        g_x += u0 * ki * t1;
        g_y += (ji2 - mi * ki2) * t1;
        g2_x2 += u1 * (ki2 - (2.0 + mi) * ji2) * t2;
        g2_y2 += u1 * (3.0 * ji2 - mi * ki2) * t2;
        g_xy += u0 * (ji2 - (2.0 + mi) * ki2) * t2;
    }
    f_x2 = 0.5 * f2_x2;
    f_y2 = 0.5 * f2_y2;
    g_x2 = 0.5 * g2_x2;
    g_y2 = 0.5 * g2_y2;
}
void
DC_Plan::bestDirection( vec3_t& nextDir, vec3_t& currPos )
{
    double x = currPos[0];
    double y = currPos[1];
    double del_x = x - x_bar;
    double del_y = y - y_bar;
    double del_x2 = del_x * del_x;
    double del_y2 = del_y * del_y;
    double del_xy = del_x * del_y;
    double f =
        f_bias +
        f_x * del_x +
        f_y * del_y +
        f_x2 * del_x2 +
        f_y2 * del_y2 +
        f_xy * del_xy;
    double g =
        g_bias +
        g_x * del_x +
        g_y * del_y +
        g_x2 * del_x2 +
        g_y2 * del_y2 +
        g_xy * del_xy;
    double mag = sqrt(f*f + g*g);
    nextDir[0] = float(f / mag);
    nextDir[1] = float(g / mag);
}
```

The invention claimed is:

1. A system implemented on a gaming server device, the system comprising:
   partitioning an artificial intelligence (AI) process for an online game into a server-side AI component, the server-side AI component being tunable, and a client-side AI component that provides tuning parameters for the server-side AI component;
   running the server-side AI component;
   offloading the client-side AI component to a gaming client device of a game player of the online game, the client-side AI component being independent of prior computations of previous glimpses of game states of the online game; and
   receiving tuning parameters from the client-side AI component to tune the server-side AI component.

2. The system as recited in claim 1, the acts further comprising structuring the client-side AI component to be deterministic to produce identical tuning parameters based at least partly on identical glimpses of a game state of the online game being sent to the client-side AI component.

3. The system as recited in claim 1, the acts further comprising:
   replicating the client-side AI component; and offloading the replicated client-side AI component to one or more other gaming client devices of one or more other game players of the online game.

4. The system as recited in claim 3, the acts further comprising:
redundantly sending a same glimpse of a game state to the gaming client device and the one or more other gaming client devices; and
applying a plurality voting scheme to the tuning parameters received from the gaming client device and tuning parameters received from the one or more other gaming client devices to overcome a tampered state of one of the gaming client device and the one or more other gaming client devices.

5. The system as recited in claim 3, the acts further comprising:
redundantly sending a same glimpse of a game state to the gaming client device and the one or more other gaming client devices; and
accepting tuning parameters that are first received from among the gaming client device and the one or more other gaming client devices to overcome a client failure.

6. The system as recited in claim 1, wherein the server-side AI component and the client-side AI component are configured to tolerate remote computation latency.

7. The system as recited in claim 1, wherein the artificial intelligence process is related to tactical navigation of the online game, and the tactical navigation employs an aggregate vector field to determine movements of gaming characters, and wherein the server-side AI component selects which direction to move a gaming character of the gaming characters via the aggregate vector field calculated as a sum of influence fields radiating from the gaming characters in the online game.

8. The system as recited in claim 7, the acts further comprising:
partitioning a calculation of the aggregate vector field between the server-side AI component and the client-side AI component via Taylor-series approximations;
receiving, from the client-side AI component, coefficients for the Taylor-series approximations based on influence fields emanating from a local subset of the gaming characters, the coefficients comprising the tuning parameters for the server-side AI component; and
summing the Taylor-series approximations of the influence fields radiating from the gaming characters, the Taylor-series approximations running at substantially a same rate as a game loop of the gaming server device.

9. The system as recited in claim 1, wherein the client-side AI component performs AI computations for a first gaming character that is in a different area of a game world than a second gaming character, the second gaming character being controlled by a local player of the game client device.

10. The system as recited in claim 1, the acts further comprising temporally limiting an effect of the gaming client device on the server-side AI component by preemptively migrating the client-side AI component via assigning successive computations for a gaming character to another gaming client device.

11. A method implemented on a gaming server device that hosts an online game, the method comprising:
partitioning an artificial intelligence (AI) process for the online game into a server-side AI component, the server-side AI component being tunable, and a client-side AI component that provides tuning parameters for the server-side AI component, the artificial intelligence process being related to tactical navigation of the online game that employs an aggregate vector field to determine movements of gaming characters, wherein the client-side AI component uses an array of descriptors for each gaming character to calculate scalar coefficients for Taylor-series approximations of the aggregate vector field;
running the server-side AI component on the gaming server device;
offloading the client-side AI component to a gaming client device of a game player of the online game; and
receiving tuning parameters from the client-side AI component to tune the server-side AI component.

12. The method as recited in claim 11, wherein the server-side AI component selects which direction to move a gaming character of the gaming characters via the aggregate vector field calculated as a sum of influence fields radiating from the gaming characters in the online game.

13. The method as recited in claim 12, wherein the scalar coefficients are computed based on a glimpse of a game state provided by the gaming server device when the gaming character of the game characters is at a given position in a virtual space.

14. The method as recited in claim 11, wherein each descriptor includes a position of a respective gaming character, a strength weighting of a respective influence field, and an exponential decay rate of the respective influence field.

15. A method implemented on a gaming server device that hosts an online game, the method comprising:
running a server-side AI component on the gaming server device;
soliciting tuning parameters as advice from a client-side AI component by sending a glimpse of part of a game state to a gaming client device that runs a client-side AI component; and
receiving tuning parameters from the client-side AI component to tune the server-side AI component, the tuning parameters comprising coefficients representing behavior possibilities based at least in part on the glimpse of the part of the game state.

16. The method as recited in claim 15, further comprising:
redundantly sending the glimpse of the part of the game state to one or more other gaming client devices; and
accepting tuning parameters that are first received from among the gaming client device and the one or more other gaming client devices to overcome a client failure.

17. The method as recited in claim 15, further comprising:
redundantly sending the glimpse of the part of the game state to one or more other gaming client devices; and
applying a plurality voting scheme to tuning parameters received from the gaming client device and the one or more other gaming client devices to overcome a tampered state of one of the gaming client device and the one or more other gaming client devices.

18. The method as recited in claim 15, wherein the client-side AI component provides a stateless and deterministic segment of a gaming AI, individual glimpse-advice exchanges between the gaming server device and the gaming client device comprising a standalone module of the gaming AI that can be executed interchangeably by the gaming client device, the standalone module running independently of prior computations and without dependence on a client-side state that has been carried forward.

19. The method as recited in claim 15, further comprising using the tuning parameters from the client-side AI component as the advice for improving behavior of a gaming character of the online game.

20. The method as recited in claim 15, wherein the gaming server device is independent of the advice from the client-side AI component to satisfactorily run the online game.

* * * * *